United States Patent Office 3,547,881
Patented Dec. 15, 1970

3,547,881
PROCESS OF REACTING A PHENOL WITH A POLY-
EPOXIDE IN THE PRESENCE OF AN ORGANIC
PHOSPHINE
Albert C. Mueller, Berkeley, Calif., and Harvey L. Parry,
Summit, N.J., assignors to Shell Oil Company, New
York, N.Y., a corporation of Delaware
No Drawing. Filed Nov. 3, 1965, Ser. No. 506,279
Int. Cl. G08g 30/04
U.S. Cl. 260—47
7 Claims

ABSTRACT OF THE DISCLOSURE

A process for reacting a phenol with an epoxy-containing compound is disclosed. This process comprises reacting a polyepoxide having more than one 1,2-epoxide group with a phenol in the presence of a phosphine catalyst. The products resulting from this process are also disclosed.

This invention relates to a new process for reacting a phenol with an epoxy-containing compound and to the resulting products. More particularly, the invention relates to a new process for effecting a specific reaction between compounds possessing a vic-epoxy group and a phenolic OH group, and to the improved products obtained thereby.

Specifically, the invention provides a new and highly efficient process for effecting a reaction between epoxy-containing compounds and compounds containing phenolic OH groups which reduces or eliminates side reactions and gives high yields of the desired hydroxy ethers. The new process comprises reacting a compound containing at least one and preferably more than one vic-epoxy group, such as, for example, a glycidyl polyether of a polyhydric phenol, with a phenol possessing at least one and preferably two or more phenolic OH groups, such as, for example, 2,2-bis(4-hydroxyphenyl)propane, in the presence of a special catalyst comprising a phosphine compound. The invention further provides new and improved products prepared by the above process.

As a special embodiment, the invention provides a new process for preparing high molecular weight polyepoxide resins which comprises reacting a polyepoxide, such as the above-noted glycidyl polyethers of polyhydric phenols, with controlled proportions of a polyhydric phenol in the presence of the phosphine catalysts.

Epoxy compounds are known to react with phenolic OH groups to form phenolic hydroxy ethers. This reaction can be used to produce a variety of valuable compounds, polymers and resins. The catalysts used for this reaction heretofore have been inorganic basis or tertiary amines which are also effective catalysts for competing reactions of epoxides with alcoholic OH groups, homopolymerization of epoxy groups and the like. As a result, the product obtained is a mixture of polymers and resins which contain varying degrees of molecular weight, chain branching and end group functionality. Such a composition detracts from the performance and utility of the said product.

It is an object of this invention, therefore, to provide a new process for reacting epoxy componds with phenols. It is a further object to provide a new process for reacting epoxy compounds with phenols which effects a clean reaction without side reactions. It is a further object to provide a new process for reacting epoxy compounds with phenols which gives the desired phenolic hydroxyl ethers in high yield and purified form, and free of undesired branching and non-functional terminations. It is a further object to provide a process for preparing new high molecular weight resins from polyepoxides and polyhydric phenols. It is a further object to provide a process for preparing new polyepoxides in high yield and purified form from low molecular weight polyepoxides and phenols. It is a further object to provide a new process for preparing brominated resins having improved flame resistance from polyepoxides and brominated phenols. These and other objects of the invention will be apparent from the following detailed description thereof.

It has now been discovered that these and other objects of the invention will be apparent from the process of the invention which comprises reacting a compound containing at least one and preferably more than one vic-epoxy group with a phenol possessing at least one and preferably two or more phenolic OH groups, such as, for example, 2,2-bis(4-hydroxyphenyl)propane, in the presence of a special catalyst comprising a phosphine compound, such as, for example, triphenylphosphine. It has been unexpectedly found that these particular compounds catalyze the reaction between the epoxy group and phenolic OH group and is specific thereto without having effect on the reaction of alcoholic OH group and epoxy group and/or the homopolymerization of the epoxy groups. As a result, one obtains the desired phenolic hydroxy ether in very high yields and purified form. The process has been found to be particularly good for forming high molecular weight polymers and resins from the polyepoxides and polyhydric phenols as noted in the working examples at the end of the specification.

The process of the invention involves the reaction of any epoxy compound and any phenol to form the desired hydroxy ether

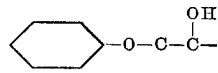

The epoxy compounds used are those possessing at least one vic-epoxy group, i.e., a

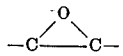

group. They may be monoepoxides or polyepoxides. The Monoepoxides may be aliphatic or cycloaliphatic or heterocyclic and may be saturated or unsaturated. They may also be substituted with aromatic rings, ether groups, halogen atoms, ester groups, and the like. Examples of the monoepoxides include, among others, styrene oxide, phenyl glycidyl ether, allyl glycidyl ether, octadecyl glycidyl ether, amyl glycidyl ether, tolyl glycidyl ether, chlorophenyl glycidyl ether, naphthyl glycidyl ether, diacetate of monoglycidyl ether of glycerol, dipropionate of the monoglycidyl ether of glycerol, diacrylate of the monoglycidyl ether of glycerol, 1,2-hexylene oxide, ethylene oxide, propylene oxide, 1 - heptylene oxide, 3 - ethyl - 1,2 - pentylene oxide, glycidyl acetate, glycidyl benzoate, glycidyl propionate, glycidyl acrylate, glycidyl allyl phthalate, glycidyl methyl maleate, glycidyl stearate, glycidyl deate, methyl 1,2 - epoxypropionate, butyl 1,2-epoxypropionate, and the like.

Preferred monoepoxides to be used include the mono-epoxy-substituted hydrocarbons, such as, for example, the alkylene oxides containing up to 12 carbon atoms, the epoxy-substituted cycloaliphatic and aromatic hydrocarbons as epoxy cyclohexane, epoxypropylbenzene, and the like; the monoepoxy substituted alkyl ethers of hydrocarbon monohydric alcohols or phenols, such as, for example, the glycidyl ethers of aliphatic, cycloaliphatic and aromatic hydrocarbon alcohols containing up to 12 carbon atoms; the monoepoxy-substituted alkyl esters of hydrocarbon monocarboxylic acids, such as, for example, glycidyl esters of aliphatic, cycloaliphatic and aromatic hydrocarbon acids, as glycidyl acrylate, glycidyl caprolate, glycidyl benzoate, and the like; the monoepoxy-substituted alkyl esters of hydracarbon polycarboxylic acids wherein the other carboxyl group or groups are esterified with alkanols, such as, for example, glycidyl esters of phthalic acid, maleic acid, isophthalic acid, succinic acid and the like, wherein each contains up to 15 carbon atoms; alkyl and alkenyl esters of epoxy-substituted monocarboxylic acids, such as esters of 1,2-epoxypropionic acid, epoxy butyric acid and epoxy pentanoic acid; epoxyalkyl ethers of polyhydric alcohols wherein the other OH groups are esterified or etherified with hydracarbon acids or alcohols, such as, for example, monoglycidyl ethers of aliphatic, cycloaliphatic polyhydric alcohols and polyhydric phenols, each containing no more than 15 carbon atoms; and monoesters of polyhydric alcohols and epoxy monocarboxylic acids wherein the other OH groups are esterified or etherified with hydrocarbon acids or alcohols, each containing no more than 15 carbon atoms.

Coming under special consideration, particularly because of the superior properties of the resulting hydroxy-substituted products are those monoepoxides which contain halogen atoms, and especially a plurality of chlorine atoms, such as epichlorohydrin, pentachlorophenyl glycidyl ether, hexachlorocyclohexyl glycidyl ether and the like.

Especially preferred are monoepoxides of the formula:

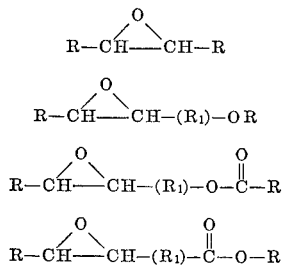

wherein R is hydrogen, a hydrocarbon or halogenated hydrocarbon radical and $R_1$ is a bivalent hydrocarbon or halogenated bivalent hydrocarbon radical, preferably containing 1 to 12 carbon atoms.

The polyepoxides used in the process of the invention comprise those compounds possessing more than one vic-epoxy group. These polyepoxides may be saturated or unsaturated, aliphatic, cycloaliphatic, aromatic or heterocyclic and may be substituted if desired with non-interfering substituents, such as halogen atoms, phosphorus atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the invention are given in U.S. 2,633,458 and it is to be understood that so much of the disclosure of that patent relative to examples of polyepoxides is incorporated by reference into this specification.

Other examples include the glycidyl ethers of novolac resins, i.e., phenol-aldehyde condensates. Preferred resins of this type are those of the formula:

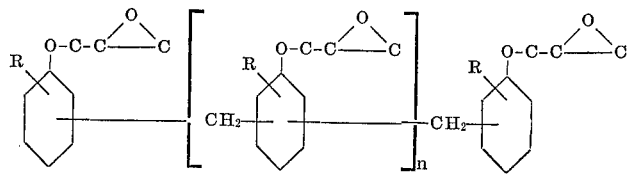

wherein R is hydrogen or an alkyl radical and $n$ is an integer of 1 to about 10. Preparation of these polyepoxides is illustrated in U.S. 2,216,099 and U.S. 2,658,885.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecandienoate, butyl 9,12,15-octadecatrienoate, butyl eleostearate, mono or diglycerides of tung oil, fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, diglycidyl phthalate, diglycidyl adipate, diglycidyl isophthalate, di(2,3-epoxybutyl) adipate, di(2,3 - epoxybutyl)oxalate, di(2,3 - epoxyhexyl) succinate, di(3,4-epoxybutyl)maleate, di(2,3-epoxyoctyl) pimelate, di(2,3-epoxybutyl)phthalate, di(2,3-epoxyoctyl) tetrahydrophthalate, di(4,5-epoxydodecyl)maleate, di(2,3-epoxybutyl)terephthalate, di(2,3 - epoxypentyl)thiodipropionate, di(5,6-epoxytetradecyl)diphenyldicarboxylate, di-(3,4-epoxyheptyl)sulfonyldibutyrate, tri(2,3-epoxybutyl) 1,2,4-butanetricarboxylate, di(5,6-epoxypentadecyl)tartarate, di(4,5-epoxytetradecyl)maleate, di(2,3 - epoxybutyl) azelate, di(3,4-epoxybutyl)citrate, di(5,6 - epoxyoctyl)cyclohexane-1,3-dicarboxylate, di(4,5-epoxyoctadecyl)malonate.

Another group of the epoxy-containing materials include those epoxidized esters of unsaturated alcohols and unsaturated carboxylic acids, such as glycidyl glycidate, 2,3-epoxybutyl 3,4 - epoxypentanoate; 3,4-epoxyhexyl 3,4-epoxypentanoate; 3,4 - epoxycyclohexyl 3,4-epoxypentanoate methyl epoxycyclohexane carboxylate.

Still another group of the epoxy-containing materials include epoxidized derivatives of polyethylenically unsaturated polycarboxylic acids, such as, for example, dimethyl 8,9,12,13-diepoxyeicosanedioate; dibutyl 7,8,11, 12-diepoxyoctadecanedioate; dioctyl 10,11-diethyl-8,9,12, 13-diepoxyeicosanedioate; dihexyl 6,7,10,11-diepoxyhexadecanedioate; didecyl 9-epoxyethyl - 10,11 - epoxyoctadecanedioate; dibutyl 3-butyl - 3,4,5,6 - diepoxycyclohexane-1,2-dicarboxylate; dicyclohexyl 3,4,5,6-diepoxycyclohexane-1,2-dicarboxylate; dibenzyl 1,2,4,5-diepoxycyclohexane-1,2-dicarboxylate and diethyl 5,6,10,11-diepoxyoctadecyl succinate.

Still another group comprises the epoxidized polyester obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

The phenols used in the process of the invention are those compounds possessing at least one OH group attached to an aromatic nucleus. The phenols may be monohydric or polyhydric and may be substituted with a great variety of different types of substituents. Examples of the phenols include, among others, phenol, resorcinol, o-cresol, m-cresol, p-cresol, carcacrol, thymol, chlorophenol, nitrophenol, dinitrophenol, picric acid, pyrocatechol, hydroquinone, pyrogallol, hydroxyhydroquinone, phloroglucinol, 2,2-bis(4-hydroxyphenyl)propane, 2,2 - bis(4 - hydroxyphenyl)pentane, 2,2-bis(4-hydroxyphenyl)pentanoic acid, 2,2-bis(4-hydroxyphenyl)sulfone, 2,2-bis(4-hydroxyphenyl)methane, 2-methoxyphenol, 2,4-dibutoxyphenol, 2,5-dichlorophenol, 3-acetoxyphenol, 2,2- bis(3 - allyl-4-hydroxyphenyl)propane, 2,2-bis(3-isobutyl-4 - hydroxyphenyl)pentane, 1,1,2,2 - tetrakis(4-hydroxyphenyl)ethane, 1,1,4,4-tetrakis(4-hydroxyphenyl)pentane and the like, and polymeric type polyhydricphenols obtained by condensing monohydric or polyhydric phenols with formaldehyde, as well as phenols of the formulae

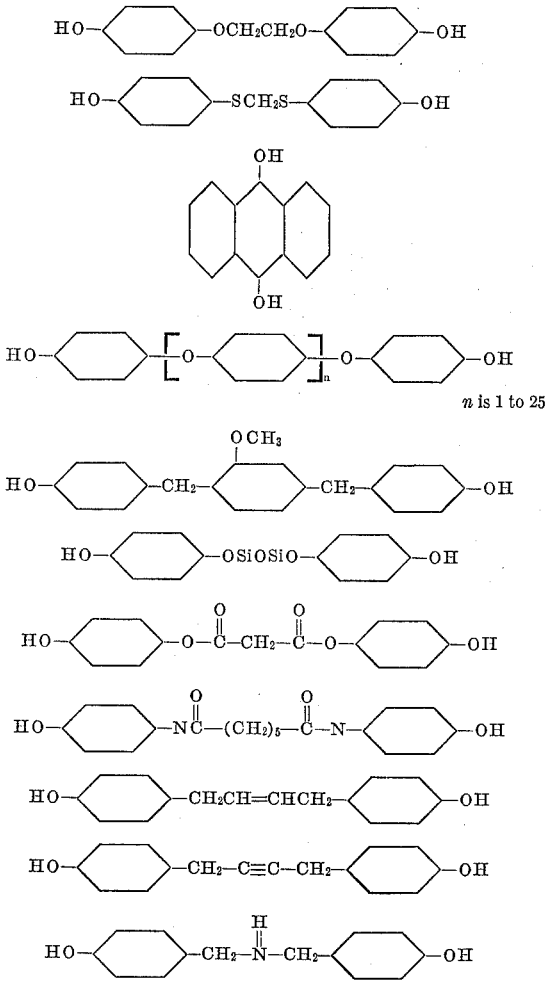

Preferred phenols to be used are the polyhydric phenols containing from 2 to 6 OH groups and up to 30 carbon atoms. Coming under special consideration are the phenols of the formula

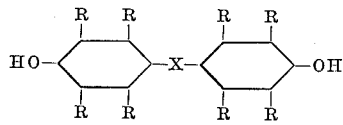

wherein X is a polyvalent element or radical and R is a member of the group consisting of hydrogen, halogen and hydrocarbon radicals. The preferred elements or radicals represented by X are oxygen, sulfur, —SO—, —SO$_2$—, bivalent hydrocarbon radicals containing up to 10 carbon atoms, and oxygen, sulfur and nitrogen-containing hydrocarbon radicals, such as —ORO—, —ORORO—, —S—R—, —S—R—S—R—S, —OSiO—

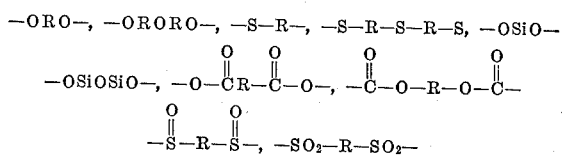

radicals wherein R is a bivalent hydrocarbon radical.

The catalyst used for the process of the invention is a phosphine. Preferred phosphines are the organic phosphines, i.e., compounds of the formula

P(R)$_3$ wherein at least one R is an organic radical and the other R's are hydrogen or organic radicals and preferably hydrocarbon radicals or substituted hydrocarbon radicals which may contain no more than 25 carbon atoms. Examples of the phosphines include triphenyl phosphine, tributyl phosphine, trilauryl phosphines, tricyclohexyl phosphine, trihexyl phosphine, triallyl phosphine, tridodecyl phosphine, trieicosadecyl phosphine, trichlorobutyl phosphine, triethoxybutyl phosphine, trihexenyl phosphine, trixylyl phosphine, trinaphthyl phosphine, tricyclohexenyl phosphine, tri(3,4 - diethyloctyl)phosphine, trioctadecyl phosphine, dioctyldecyl phosphine, dicyclohexyl phosphine, dibutyl allyl phosphine and the like, and mixtures thereof.

Particularly preferred phosphines to be employed include the trihydrocarbyl, dihydrocarbyl and monohydrocarbyl phosphines wherein the hydrocarbyl radicals (hydrocarbon radicals) contain from 1 to 18 carbon atoms, and more particularly those wherein the hydrocarbon radicals are alkyl, cycloalkyl, alkenyl, cycloalkenyl, aryl, alkaryl, arylalkyl, and the like radicals. Coming under special consideration are the phosphines containing at least one and preferably three aromatic radicals.

The amount of the polyepoxide and the phenol to be employed in the process may vary over a wide range depending upon the type of reactants and the type of product to be desired. In general, these reactants are used in approximately chemical equivalent amounts, i.e., a chemical equivalent amount of the phenol will be that sufficient to furnish one phenolic OH for every epoxy group to be reacted. For example, if one is reacting a diepoxide with a monohydric phenol and both epoxy groups are to be reacted, one mole of diepoxide should be reacted with about two moles of the monohydric phenol. On the other hand, if one is reacting a diepoxide with a dihydric phenol and a monomer product is desired by reacting both epoxide groups, one should react one mole of the diepoxide with about 2 moles of the polyhydric phenol. If a polymeric product is desired smaller ratios should be utilized as desired, such as, for example, 4 moles of the diepoxide and 5 moles of the polyhydric phenols.

Superior results of the new process are obtained when the higher molecular weight resins are obtained and in this case the ratios of reactants are varied depending upon the molecular weight desired and upon the type of end groups, i.e., whether the product is to be terminated with an epoxide or with a phenol. The production of such higher molecular weight product is illustrated in the examples at the end of the specification.

The amount of the phosphine catalyst will vary over a wide range. In general, amount of catalyst will vary from about .001% to about 10% by weight, and more preferably from about 0.05% to about 5% by weight of the reactants.

The reaction may be conducted in the presence or absence or solvents or diluents. In most cases, the reactants will be liquid and the reaction may be easily effected without the addition of solvents or diluents. However, in some cases, whether either or both reactants are solids or viscous liquids it may be desirable to add diluents to assist in effecting the reaction. Examples of such materials include the inert liquids, such as ketones, inert hydrocarbons as xylene, toluene, cyclohexene and the like.

If solvents are employed in the reaction and the resulting product is to be used for coating purposes, the solvent may be retained in the reaction mixture. Otherwise, the solvent can be removed by any suitable method such as by distillation and the like. Unlike inorganic bases or amines, it is not necessary to remove the phosphine catalysts. This is an advantage as shown by Example VI.

The products obtained by the above process will be the desired phenolic hydroxy ether compounds. Their physical characteristics will depend upon the desired reactants and proportions. In general, the products will vary from liquids to solids, and in the case of the high molecular weight resins will vary from viscous liquids to hard solids. The products will possess at least one alcoholic OH group formed by each reaction of the epoxide and phenol OH group, and can be further reacted through this group or groups. The polyfunctional reactants will also give products terminated in phenolic OH groups and/or epoxy groups, and these will be available for further reaction.

A group of products which are particularly outstanding are those resins and polymers obtained by the reaction of the polyepoxides and polyhydric phenols in controlled proportions. Those which use an excess of the polyepoxide will be terminated in epoxy groups and can be used as polyepoxides in known reactions of polyepoxides with curing agents and the like. The new high molecular weight polyepoxides are particularly useful in preparing surface coatings, adhesives, laminates, filament windings, coatings for highways and airfields, structural applications, formation of foams and the like. Those prepared from the halogenated polyhydric phenols as shown hereinafter are particularly useful as flame proofing resins for forming laminates, coatings and the like.

As noted, the new polyepoxides can be reacted with curing agents to form hard insoluble infusible products. The curing agents for the products include materials which are preferably acidic or alkaline. Example of suitable curing agents include among others, the polybasic acids and their anhydrides, such as, for example, the di, tri- and higher carboxylic acids as oxalic acid, phthalic acid, terphthalic acid, succinic acid, alkyl and alkenyl-substituted succinic acids, tartaric acid, and particularly the polymerized unsaturated acids, such as, for example, those containing at least 10 carbon atoms, and preferably more than 14 carbon atoms, as for instance dodecenedioic acid, 10,12-eicosadienedioic acid, and anhydrides as phthalic anhydride, succinic anhydride, maleic anhydride, nadic anhydride, pyromellitic anhydride and the like.

Other types of acids that are useful are those containing sulfur, N, phosphorus or halogens; chloridic acid, benzene phosphinic, sulfonyl dipropionic acid bis(4-carboxyphenyl)amide.

Other preferred curing agents include the amino-containing compounds, such as, for example, diethylene triamine, triethylene tetramine, dicyandiamide, melamine, pyridine, cyclohexylamine, benzyldimethylamine, benzylamine, diethylaniline, triethanolamine, piperidine, tetramethylpiperazine, N,N-dibutyl-1,3-propane diamine, N-N-diethyl-1,3-propane diamine, 1,2-diamino-2-methylpropane, 2,3-diamino-2-methylbutane, 2,3-diamino-2-methylpentane, 2,4-diamino-2,6-dimethyloctane, dibutylamine, dioctylamine, dinonylamine, distearylamine, diallylamine, dicyclohexylamine, methylethylamine, ethylcyclohexylamine, pyrrolidine, 2-methylpyrrolidine, tetrahydropyridine, 2-methylpiperidine, 2,6-dimethylpiperidine, diaminopyridine, tetramethylpentane, meta-phenylene diamine and the like, and soluble adducts of amines and polyepoxides and their salts, such as described in U.S. 2,651,589 and U.S. 2,640,037. Still other examples include the acetone soluble reaction products of polyamines and monoepoxides, the acetone soluble reaction products of polyamines with unsaturated nitriles, such as acrylonitrile, imidazoline compounds as obtained by reaction monocarboxylic acids with polyamine, sulfur and/or phosphorus-containing polyamines as obtained by reacting a mercaptan or phosphine containing active hydrogen with an epoxide halide to form a halohydrin, dehydrochlorinating and then reacting the resulting product with a polyamine, soluble reaction product of polyamines with acrylates, and many other types of reaction products of the amines.

Still other curing agents that may be used include boron trifluoride and complexes of boron trifluoride with amines, ethers, phenols and the like, Friedel Crafts metal salts, such as aluminum chloride, zinc chloride, and other salts, such as zinc fluoborate, magnesium perchlorate and zinc fluosilicate; inorganic acids and partial esters as phosphoric acid and partial esters thereof including n-butyl orothiophosphate, diethyl orthophosphate and hexaethyltetraphosphate and the like.

Another type of curing agent to be employed includes the polyamides containing active amino and/or carboxyl groups, and preferably those containing a plurality of amino hydrogen atoms. Examples of polybasic materials used in making these polyamides include, among others, 1,10-decanedioic acid, 1,12-dodecanedienedioic acid, 1,20-eicosadienedioic acid, 1,14-tetradecanedioic acid, 1,18-octadecanedioic acid and dimerized and trimerized fatty acids as described above. Amines used in making the polyamides include preferably the aliphatic and cycloaliphatic polyamines as ethylene diamine, diethylene triamine, triethylene tetramine, tetraethylene pentamine, 1,4-diaminobutane, 1,3-diaminobutane, hexamethylene diamine, 3-(N-isopropylamino)propylamine and the like. Especially preferred polyamides are those derived from the aliphatic polyamides containing no more than 12 carbon atoms and polymeric fatty acids obtained by dimerizing and/or trimerizing ethylenically unsaturated fatty acids containing up to 25 carbon atoms. These preferred polyamides have a viscosity between 10 and 750 poises at 40° C., and preferably 20 to 250 poises at 40° C. Preferred polyamides also have amine values of 50 to 450.

Still another group of curing agents are those based on melamine reaction products containing methylol substituents.

The amount of curing agent may vary considerably depending upon the particular agent employed. For the alkalies or phenoxides, 1% to 4% is generally suitable. With phosphoric acid and esters thereof, good results are obtained with 1 to 10% added. The tertiary amine compounds are preferably used in amounts of about 1% to 15%. The acids, anhydrides, polyamides, polyamines, polymercaptans, etc. are preferably used in at least 0.8 equivalent amounts, and preferably 0.8 to 1.5 equivalent amounts. An equivalent amount refers to that amount needed to give one active H (or anhydride group) per epoxy group.

The polyepoxide may be prepared by a variety of different methods. All of the components may be mixed together in any order, or they may be mixed together in separate groups.

Solvents or diluents may also be added to make the composition more fluid or sprayable. Preferred solvents or diluents include those which are volatile and escape from the polyepoxide composition before or during cure such as esters as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc. and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ normally liquid glycidyl compounds, glycidyl cyclopentyl ether, diglycidyl ether, glycidyl ether of glycerol and the like, and mixtures thereof.

Other materials may also be added to the composition as desired. This includes other types of polyepoxides such as described in U.S. 2,633,458. This also includes fillers, as sand, rocks, resin particles, graphite, asbestos, glass or metal oxide fibers, and the like, plasticizers, stabilizers asphalts, tars, resins, insecticides, fungicides, anti-oxidants, pigments, stains and the like.

The temperature employed in the cure will vary depending chiefly on the type of curing agent. The amino-containing curing agents generally cured at or near room temperature and no heat need be applied. The acids, anhydrides, and melamine derivatives, on the other hand, are generally used for heat, such as temperatures ranging from 150° F. to about 400° F. Preferred temperatures range from about 200° F. to about 400° F. and more preferably from about 250° F. to 350° F.

The compositions containing the polyepoxides and curing agents may be used for a variety of important applications. They may be used, for example, as adhesives for metal, wood, concrete, plaster and the like, and as surface coatings for various types of surfaces. The new compositions may also be used in the preparation of laminates or resinous particles reinforced with fibrous textiles. They may also be used in the formation of castings and molding and for the encapsulation of electrical equipment.

To illustrate the manner in which the invention may be carried out, the following examples are given. It is to be understood, however, that the examples are for the purpose of illustration and that the invention is not to be regarded as limited to any of the specific conditions or reactants recited therein. Unless otherwise indicated, parts described in the examples are parts by weight. The polyepoxides referred to by letter are those in U.S. 2,633,458.

EXAMPLE I

This example illustrates the reaction of diglycidyl ether of 2,2-bis(4-hydroxyphenyl)propane with phenol in the presence of triphenyl phosphine.

10 parts of diglycidyl ether of 2,2-bis(4-hydroxyphenyl)propane was combined with 2.27 parts of phenol and .1 part of triphenyl phosphine and the mixture kept at 75° C. for about 16 hours. Analysis of the resulting product indicated was:

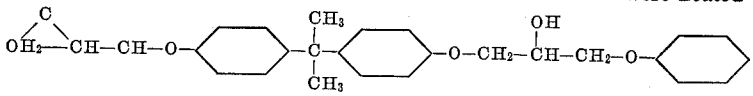

The epoxy value was followed throughout the above reaction to determine the loss of product through competing reactions. The epoxy value at the start of the reaction was 4.68 eq./100 g. Theoretically ½ should react with the phenol so that the value at the end should be 2.34 eq./100 g. At the end of the above reaction, the epoxy value was 2.48 eq./100 g. indicating a very clean reaction. In a similar experiment conducted in the presence of a tertiary amine in place of the phosphine, the end epoxy value was 1.00 eq./100 g. indicating a great loss of epoxy through other types of reactions.

EXAMPLE II

This example illustrates the reaction of phenyl glycidyl ether with phenol in the presence of triphenyl phosphine.

1.20 parts of phenyl glycidyl ether was combined with 6.25 parts phenol and .1 part of phosphine and the mixture kept at 75° C. for about 16 hours. Analysis indicated that the resulting product was:

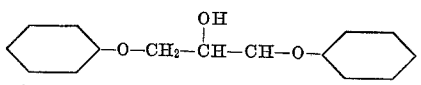

Analysis for epoxy value indicated that there was substantially no epoxide loss to other reactions, while in a similar experiment with a tertiary amine as the catalyst there was considerable loss of epoxy groups.

EXAMPLE III 10 parts of diglycidyl ether of 2,2-bis(4-hydroxyphenyl)propane and 7.05 parts of 2,2-bis(4-hydroxyphenyl)propane was mixed with .1 part of triphenyl phosphine in benzene as a solvent. The mixture was kept at 70° C. for 2 days. Analysis indicated the product was a high molecular weight resin having alternating units of the diglycidyl ether and the bisphenol. The resin was thermoplastic and soluble in benzene. In a related experiment wherein a tertiary amine was employed in place of the phosphine, the resulting product was a hard, insoluble infusible resin indicating cross linking via homopolymerization of the epoxy compound.

EXAMPLE IV

Examples I and III are repeated using trilauryl phosphine. Related results are obtained.

EXAMPLE V

This example illustrates the use of the procession preparing a higher molecular weight resin from the diglycidyl ether of 2,2-bis(4-hydroxyphenyl)propane (Polyether A) and bis-phenol A, i.e., 2,2-bis(4-hydroxyphenyl)propane.

17.5 parts (0.1 eq.) of Polyether A, 11.4 parts of bisphenol A (0.1 eq.) and 0.1 part of triphenyl phosphine were mixed together in reactor and the mixture heated and stirred on a hot plate. When the temperature reached 140–150° C., there was an exotherm to 215° C. The resulting product was viscous at 215° C. but was not gelled. The product was then cooled to room temperature to form a hard, tough material. Very elastic, strong filaments could be drawn from the melt. The inherent viscosity of the product was 0.40.

EXAMPLE VI

This example illustrates the use of the process in making an intermediate molecular weight polyepoxide from a mixture of Polyether A, bisphenol A, and tetrabromobisphenol A.

66.2 parts of Polyether A, 31.5 parts of tetrabromobisphenol A, 2.3 parts of bisphenol A, and 0.05 part of triphenylphosphine were charged to a jacketed, stirred reaction kettle and blanketed with nitrogen. The contents were heated to 120° C. and then allowed to exotherm to 170° C. The mixture was maintained at this temperature for 1.5 hours and then cooled to give a frangible solid melting about 75° C. and readily soluble in acetone.

100 parts of the above-described solid were combined with 4 parts of dicyandiamide and heated to 175° C. The resulting product was a hard insoluble infusible resin.

Essentially identical experiments were run in which the triphenylphosphine was replaced with either sodium carbonate or triethylamine. In the case of the sodium carbonate catalyzed material it was necessary to filter the hot viscous material at the completion of the desired reaction to remove the suspended catalyst and minimize continued undesirable reaction of the remaining epoxy groups with the alcoholic hydroxyl groups produced by the primary reaction. In the case of the triethylamine catalyst materials it was necessary to apply a vacuum at the completion of the primary reaction to remove the catalyst and minimize further reaction.

The following table gives the analyses on the above products and clearly shows the efficacy of the triphenylphosphine as compared to the two conventional catalysts in minimizing side reactions.

| Property | Theoretical value | Values obtained with— | | |
| --- | --- | --- | --- | --- |
| | | TTP cat. | Na₂CO₃ cat. | TEA cat. |
| Epoxy, eq./100 g | 0.218 | 0.216 | 0.210 | 0.199 |
| Phenolic, eq./100 g | 0 | 0.0002 | 0.003 | 0.0006 |

EXAMPLE VII 463.8 g. of Polyether A, 136.2 g. of bisphenol A, and 0.3 g. of tributylphosphine were combined and heated for 1 hour and 20 minutes in the range of 122–138° C. On cooling there resulted a frangible soluble fusible solid with an epoxy content of 0.204 eq./100 g. Based on the analysis of the starting materials, the theoretical epoxy content of the product, assuming no side reactions, would also be 0.204 eq./100 g.

A glass cloth laminate made from this resin cured with 4 phr. of dicyandiamide had a flexural strength of 47,000 p.s.i.

Other catalysts that may be used but are less preferred are the organic arsines, stibines and bismuthines. The organo-substituted arsines useful as catalysts are those of the formula $AS(R)_3$ wherein at least one R is an organic radical and the other R's may be hydrogen or organic radicals. Particularly preferred arsines include the trihydrocarbyl arsines and the dihydrocarbyl arsines such as tricyclohexyl arsine, triphenyl arsine, trioctyl arsine, diphenyl butyl arsine, trixylyl arsine, tridecyl arsine, dicyclohexyl arsine, and tricyclohexenyl arsine. Particularly preferred arsines include the trialkyl, tricycloalkyl, tri(alkylcycloalkyl), triaryl and trialkaryl arsines and particularly those wherein each alkyl, cycloalkyl, alkcycloalkyl and aryl and alkaryl radicals contain no more than 12 carbon atoms and preferably not more than 9 carbon atoms.

The organo-substituted stibines are those of the formula $Sb(R)_3$ wherein at least one R is an organic radical and the other R's may be hydrogen or organic radicals. Preferred stibines include the trihydrocarbyl stibines and the dihydrocarbyl stibines, such as triphenyl stibine, tridodecyl stibine, tributyl stibine, dicyclohexyl stibine, tricyclohexenyl stibine and tri(2-ethylhexyl)stibine. Particularly preferred stibines include the trialkyl, tricycloalkyl, tri(alkylcycloalkyl), triaryl and trialkaryl stibines and particularly those wherein each alkyl, cycloalkyl, alkcycloalkyl and aryl and alkaryl radicals contain no more than 12 carbon atoms and preferable not more than 9 carbon atoms.

The organo-substituted bismuthines are those of the formula $Bi(R)_3$ wherein at least one R is an organic radical and the other R's may be hydrogen or organic radicals. Preferred bismuthines include the trihydrocarbyl bismuthines and the dihydrocarbyl bismuthines, such as, for example, trixylyl bismuthine, triphenyl bismuthine, tributyl bismuthine, tricyclohexyl bismuthine, tridecyl bismuthine and diphenyl octyl bismuthine. Particularly preferred bismuthines include the trialkyl, tricycloalkyl, tri(alkcycloalkyl), triaryl and trialkaryl bismuthines and particularly those wherein each alkyl, cycloalkyl, alkcycloalkyl and aryl and alkaryl radicals contain no more than 12 carbon atoms and preferably not more than 8 carbon atoms.

The amount and use of the arsines, stibines and bismuthines are as noted above for the phosphines.

We claim as our invention:

1. A process comprising reacting a polyepoxide having more than one 1,2-epoxide group with a polyhydric phenol in the presence of an organic phosphine of the general formula:

$$P(R)_3$$

wherein R is a hydrocarbyl radical containing from 1 to 18 carbon atoms and is selected from the group consisting of alkyl, cycloalkyl, alkenyl, cycloalkenyl and aryl radicals.

2. A process as in claim 1 wherein the polyepoxide is a glycidyl polyether of a polyhydric phenol.

3. A process as in claim 1 wherein the organic phosphine is triphenyl phosphine.

4. A process as in claim 1 wherein the organic phosphine is tributyl phosphine.

5. A process as in claim 1 wherein the organic phosphine is trilauryl phosphine.

6. A process as in claim 1 wherein the polyepoxide is a glycidyl polyether of a polyhydric phenol and the phenol is brominated 2,2-bis(4-hydroxyphenyl)propane.

7. A process as in claim 1 wherein the amount of the organic phosphine varies from about 0.01% to 10% by weight.

References Cited

UNITED STATES PATENTS

| | | | |
|---|---|---|---|
| 2,615,008 | 10/1952 | Greenlee | 260—EPC |
| 2,768,153 | 10/1956 | Shokal | 260—47EPCA |

WILLIAM H. SHORT, Primary Examiner

T. E. PERTILLA, Assistant Examiner

U.S. Cl. X.R.

260—18, 348, 613, 830